United States Patent
Williams et al.

(10) Patent No.: US 9,880,898 B2
(45) Date of Patent: Jan. 30, 2018

(54) TRANSMISSION CONTROL CHECKING FOR INTERCONNECT CIRCUITRY

(71) Applicant: ARM LIMITED, Cambridge (GB)

(72) Inventors: Michael Williams, Cambridge (GB); Simon John Craske, Cambridge (GB); Loïc Pierron, Cambridge (GB)

(73) Assignee: ARM Limited, Cambridge (GB)

( * ) Notice: Subject to any disclaimer, the term of this patent is extended or adjusted under 35 U.S.C. 154(b) by 78 days.

(21) Appl. No.: 14/793,914

(22) Filed: Jul. 8, 2015

(65) Prior Publication Data

US 2016/0048423 A1 Feb. 18, 2016

(30) Foreign Application Priority Data

Aug. 14, 2014 (GB) .................................. 1414417.4

(51) Int. Cl.
*H04L 1/18* (2006.01)
*G06F 11/10* (2006.01)
*H04L 1/00* (2006.01)

(52) U.S. Cl.
CPC .......... *G06F 11/1004* (2013.01); *H04L 1/004* (2013.01); *H04L 1/0045* (2013.01); *H04L 1/0061* (2013.01)

(58) Field of Classification Search
CPC ...... G06F 11/10; G06F 13/14; G06F 11/1004; H04L 1/00; H04L 1/004; H04L 1/0045; H04L 1/0061
See application file for complete search history.

(56) References Cited

U.S. PATENT DOCUMENTS

| | | | |
|---|---|---|---|
| 6,487,679 B1 * | 11/2002 | Arimilli | G06F 11/1443 714/17 |
| 6,530,043 B1 * | 3/2003 | Beardsley | H04L 1/0041 714/43 |
| 6,604,159 B1 | 8/2003 | Thekkath et al. | |
| 6,915,446 B2 * | 7/2005 | Riley | G06F 11/10 710/307 |
| 7,007,119 B2 * | 2/2006 | Howard | G06F 13/4022 345/540 |
| 7,406,632 B2 * | 7/2008 | Sealey | G06F 11/0772 714/47.2 |

(Continued)

FOREIGN PATENT DOCUMENTS

EP   0 889 412    1/1999
WO   WO 2014/052261   4/2014

OTHER PUBLICATIONS

Japanese Office Action dated Feb. 17, 2017 in JP 2015-155998 and English translation, 7 pages.

(Continued)

*Primary Examiner* — Esaw Abraham
(74) *Attorney, Agent, or Firm* — Nixon & Vanderhye P.C.

(57) ABSTRACT

Transmission control checking circuitry adds control check data to a transaction response which is received at a transaction master and compared with expected data at the transaction master. The expected data having control check data may be a unique transaction identifier. The transaction master generated the unique transaction identifier when it generated the transaction request and will check that the transaction responses include that unique transaction identifier. In this way, errors in the control of transmission of transactions (e.g., misrouting) may be detected.

14 Claims, 8 Drawing Sheets

(56) References Cited

U.S. PATENT DOCUMENTS

| | | | |
|---|---|---|---|
| 7,523,342 B1 | 4/2009 | Fu et al. | |
| 7,860,424 B2 * | 12/2010 | Lura | G06F 9/4446 |
| | | | 399/21 |
| 8,179,793 B2 * | 5/2012 | Brocke | H04L 12/5695 |
| | | | 370/230 |
| 8,201,134 B2 * | 6/2012 | Ruffner | G06F 17/5036 |
| | | | 716/137 |
| 8,363,487 B2 * | 1/2013 | Ehrenreich | G11C 16/349 |
| | | | 365/189.07 |
| 8,644,305 B2 * | 2/2014 | Clark | G06F 17/5031 |
| | | | 370/362 |
| 2003/0018828 A1 | 1/2003 | Craddock et al. | |
| 2006/0095604 A1 | 5/2006 | Edirisooriya | |
| 2010/0229077 A1 * | 9/2010 | Sugita | G06F 11/10 |
| | | | 714/807 |
| 2011/0161681 A1 | 6/2011 | Dhuse et al. | |
| 2012/0290752 A1 | 11/2012 | Lim | |
| 2012/0331197 A1 | 12/2012 | Campbell et al. | |
| 2014/0223052 A1 * | 8/2014 | Chavali | G06F 13/1605 |
| | | | 710/110 |

OTHER PUBLICATIONS

Search Report for GB1414417.4 dated Feb. 2, 2015, four pages.
Amended Search Report for GB1414417.4 dated Apr. 1, 2015, two pages.
Further Search Report for GB1414417.4 dated Apr. 1, 2015, two pages.
Extended European Search Report dated Oct. 15, 2015 in EP 15174242.6, 7 pages.

* cited by examiner

78              80
UTID = [Master ID] : [Intra Master Sequence Number]
                        or
                [Address Buffer Location]

FIG. 9

TRANSMISSION CONTROL CHECKING FOR INTERCONNECT CIRCUITRY

This application claims priority to GB Patent Application No. 1414417.4 filed 14 Aug. 2014, the entire content of which is hereby incorporated by reference.

BACKGROUND

Field

This disclosure relates to the field of data processing systems. More particularly, this disclosure relates to errors arising in the transmission of transactions via interconnect circuitry between one or more transaction masters and one or more transaction slaves.

Description

It is known to provide interconnect circuitry with mechanisms which generate and then check error detection codes (EDC), such as parity, applied to data and addresses passed across interconnect circuitry as part of transactions between transaction masters and transaction slaves. Such error correction codes may be used to detect, and potentially correct, errors arising in the data and address values which are transmitted.

Another source of error in such systems is that the control of the transmission of the transactions, as distinct from the content of the transactions themselves, may be subject to error. As an example, the interconnect circuitry may include many multiplexers and a single bit upset for a control signal to such a multiplexer may result in a transaction being routed to the wrong master or the wrong slave. Within systems where data integrity is important (e.g. safety critical systems), it is desirable that such errors in the control of transmission of transactions should at least be detected.

One possible approach to dealing with detecting errors in the control of transmission of transactions would be to provide a duplicate instance of the interconnect circuitry and operate this in lockstep with the primary interconnect circuitry. This would permit the outputs of the two instances of the interconnect circuitry to be compared and any difference would indicate an error within the interconnect circuitry. A disadvantage with such an approach would be the significant additional overhead associated with providing duplicate interconnect circuitry and comparators. Such duplicate interconnect circuitry and comparators would increase the circuit area, cost and power consumption of the data processing system.

SUMMARY

At least some example embodiments of the disclosure provide apparatus comprising:
a transaction response receiver to receive a transaction response from one of one or more transaction slaves via interconnect circuitry, said transaction response including payload data and control check data; and
control checking circuitry:
(i) to hold, prior to receipt of said transaction response, expected data corresponding to correct control of transmission of a transaction associated with said transaction response;
(ii) to check, following receipt of said transaction response, if said control check data matches said expected data; and
(iii) if said control check data does not match said expected data, then to trigger reporting of and action upon a detected error.

At least some further example embodiments of the disclosure provide apparatus comprising:
a transaction request receiver to receive a read transaction request from a given transaction master of one or more transaction masters via interconnect circuitry, said read transaction request including control check data for triggering reporting of and action upon a detected error;
a transaction response generator to generate a read transaction response corresponding to said transaction request and including read data and said control check data; and
a transaction response transmitter to transmit said transaction response to said given transaction master.

At least some further example embodiments of the disclosure provide apparatus comprising:
a transaction request receiver to receive a write transaction request from a given transaction master of one or more transaction masters via interconnect circuitry, said write transaction request including request control check data; and
a write data receiver:
(i) to receive write data accompanied by write data control cheek data;
(ii) to check that said write data corresponds to said write transaction request by checking that said write data control check data matches said request control check data; and
(iii) if said write data control check data does not match said request control check data, then to trigger reporting of and action upon a detected error.

At least some further example embodiments of the disclosure provide apparatus comprising:
a transaction request receiver to receive a write transaction request for a sequence of write data transfers via interconnect circuitry, each of said write data transfers including respective sequence check data; and
a write data receiver:
(i) to receive a received write data transfer accompanied by received sequence check data;
(ii) to check that said received write data transfer corresponds to a next expected write data transfer by checking that said received sequence check data matches expected next sequence check data; and
(iii) if said received write data transfer does not match said next expected write data transfer, then to trigger reporting of and action upon a detected error.

At least some further example embodiments of the disclosure provide apparatus for processing data comprising one or more transaction masters connected via interconnect circuitry to one or more transaction slaves and comprising transmission control checking circuitry as set out above.

At least some further example embodiments of the disclosure provide a method comprising the steps of:
receiving a transaction response from one of one or more transaction slaves via interconnect circuitry, said transaction response including payload data and control check data; and
holding, prior to receipt of said transaction response, expected data corresponding to correct control of transmission of a transaction associated with said transaction response;
detecting, following receipt of said transaction response, if said control check data matches said expected data; and
if said control check data does not match said expected data, then triggering reporting of and action upon a detected error.

The above, and other objects, features and advantages of this disclosure will be apparent from the following detailed description of illustrative embodiments which is to be read in connection with the accompanying drawings.

The present disclosure recognises that by adding control check data to a transaction response and then comparing this with control check data which is already held by the circuitry receiving the transaction response, an error in the control of the transmission through the interconnect circuitry may be detected and appropriate reporting and action upon that detected error may be triggered. The disclosure recognises that an originator of a transaction request may add control check data to a transaction request, which can then be reflected back to the source of the transaction in the associated transaction response to detect if the transaction response does or does not properly correspond to the transaction request which was sent, e.g. check for a routing error through the interconnect circuitry. It will be appreciated that the expected data may be stored within the control checking circuitry itself or remote therefrom. The control checking circuitry is able to access the expected data when it needs to compare with it the control check data within the transaction response.

Another aspect of the present disclosure is the provision of a mechanism at a transaction slave which serves to reflect control check data back to the originating transaction master by adding this to a read transaction response sent to the transaction master.

The present techniques also permit detection of errors at a transaction slave by permitting the transaction slave to compare control check data associated with a write request against control check data subsequently received by the slave for what purports to be corresponding write data. If the write data control check data does not match the request control check data, then this indicates that the write data does not properly correspond to the write request which was received.

A transaction slave may be arranged to check that write data which it receives has an expected sequence by checking that received sequence check data which accompanies a received write data transfer corresponds to a next expected write data transfer. If such a check is not passed, then this indicates at least an error in the sequencing or generation of the write data transfers.

It will be appreciated that the transmission control checking circuitry discussed above may be provided as a separate entity to the transaction masters and transaction slaves themselves, eg. provided as wrapper circuitry which may be used to give additional functionality to legacy transactions masters and transaction slaves. However, it is also possible in some embodiments that the transaction masters and the transaction slaves may directly incorporate the transmission control checking circuitry previously described.

Another aspect of at least some example embodiments of the present disclosure is the provision of an apparatus of processing data comprising one or more transaction masters connected via interconnect circuitry to one or more transaction slaves and comprising transmission control circuitry as previously described. The transmission control circuitry may be used to check for errors in the control of transmission of all transactions across the interconnect circuitry concerned or, in some embodiments, if desired may be used to check for errors in transmission occurring across only a subset of the potential paths corresponding to critical portions of the apparatus as a whole.

EMBODIMENTS

Figure 1:
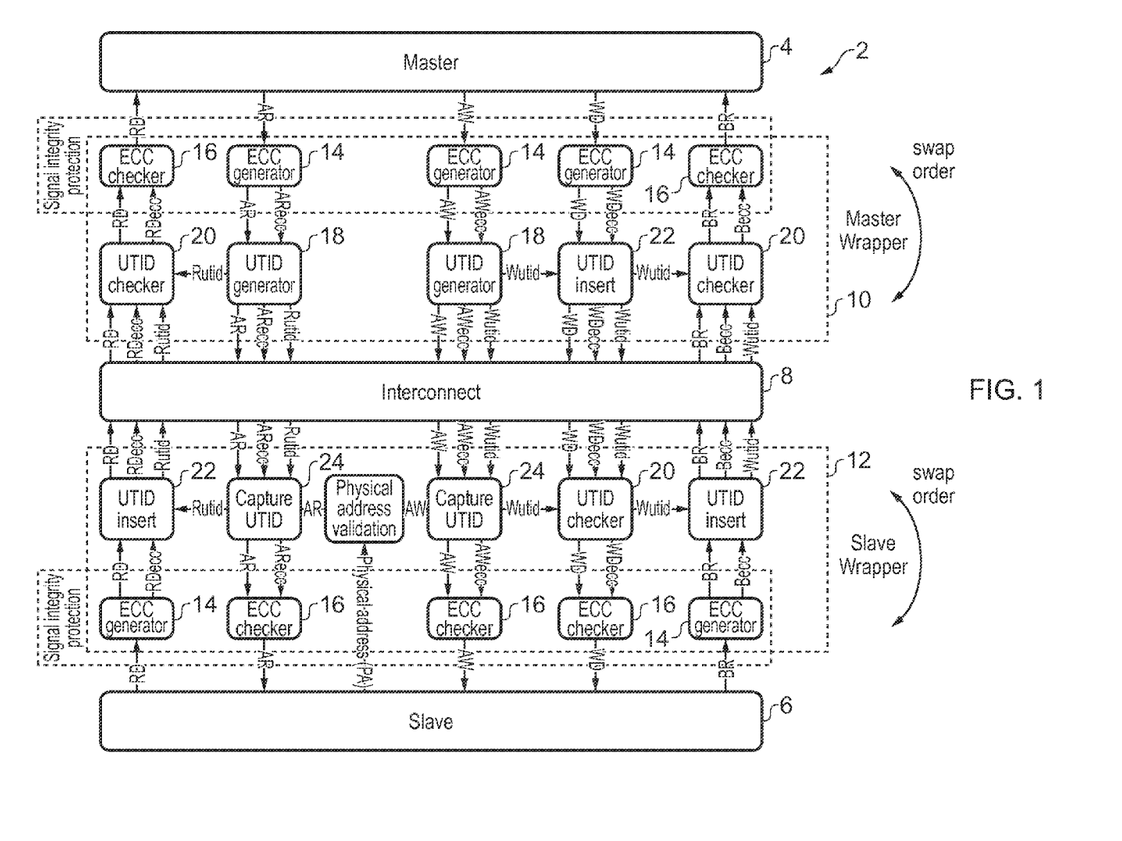
FIG. 1 schematically illustrates a data processing apparatus including a bus master, a bus slave, interconnect circuitry and transmission control checking circuitry.

FIG. 1 schematically illustrates a data processing apparatus 2 including a transaction master 4, a transaction slave 6 and interconnect circuitry 8. Master wrapper circuitry 10 is disposed between the transaction master 4 and the interconnect circuitry 8. Slave wrapper circuitry 12 is disposed between the transaction slave 6 and the interconnect circuitry 8. The master wrapper 10 includes transmission control checking circuitry on each of the channels of the transaction protocol. These channels include a read data channel RD, a read address channel AR, a write address channel AW, a write data channel WD and a write response channel B. The read address channel AR, the write address channel AW, and the write data channel WD pass from the transaction master 4 to the transaction slave 6. The read data channel RD and the write response channel B pass from the transaction slave 6 to the transaction master 4. Each of these channels includes payload data (e.g. data, address, response, etc.) as well as error correction codes and control check data which are added and checked within the master wrapper 10 and the slave wrapper 12.

As illustrated, the data/address/response values to be transmitted are passed to error correction code generators 14 where error correction codes (ARecc) are added to them in order to permit detection and correction of one or more bit areas in the protected data. It will be appreciated that error correction codes are only one example form of signal integrity protection which may be provided to the data/address/response values to be transmitted. Other example forms of signal integrity protection include parity bits.

When the payload transaction is received at its destination, then an error correction code checker 16 serves to read the accompanying error correction code and compare this with the protected payload to detect if there are any bit errors and, if necessary and possible, then to correct those bit errors. Another option is not to correct the error (even if possible) and to signal an error, e.g. errors in addresses are unlikely to be corrected. The error correction code generators 14 and the error correction code checker 16 accordingly provide signal integrity protection for the payload data as it is passed between the transaction master 4 and the transactions slave 6 by the interconnect circuitry 10. The error correction code generators 14 and the error correction code checker 16 do not provide protection against errors arising in the control of the transmission through the interconnect circuitry 8, e.g. misrouting of transactions, inappropriate repeating of transactions, inappropriate changing of the sequencing of transactions etc. Transmission control checking circuitry in the form of sequence number generators 18, sequence number checkers 20, sequence number inserters 22 and sequence number capturers 24 are provided within the master wrapper 10 and the slave wrapper 12. These elements of the transmission control checking circuitry act together so as to provide transaction response receivers and control checking circuitry.

As an example, consider the issuing of a read transaction by the transaction master 4. A read transaction request is sent out upon the read address channel AR. The sequence number generator 18 generates a unique transaction identifier UTID (marked Rutid in FIG. 1) for that read transaction request. The read transaction request is routed by the interconnect circuitry 8 to the transaction slave 6. It will be appreciated that in the illustration of FIG. 1 only a single transaction slave 6 is illustrated, but in practice multiple different transaction slaves 6 will be present and that the interconnect circuitry 8 should route the read transaction request to the correct one of these multiple transaction slaves 6.

When the read transaction request arrives at the transaction slave 6, then a sequence number capturer 24 reads the new transaction identifier UTID and stores this. The receiving transaction slave 6 also checks that the physical address of the received transaction matches the physical address of the transaction slave 6. This checks that the transaction identifier UTID has been delivered to the correct transaction slave 6 (and so avoids, for example, stuck at errors). The check of physical address may be performed for other types of transaction, e.g. writes. When the read data transaction responses are returned from the transaction slaves 6 to the transaction master 4 via the read data channel RD, then they pass through the sequence number inserter 22 where the unique identifier UTID (as previously stored) is added to the data responses. The unique transaction identifier UTID corresponds to control check data which is included within a side band channel within the transaction signals and accompanies the transaction signals both in the read transaction request and the read transaction response(s). This unique transaction identifier UTID does not influence the routing of the transaction, rather it is used to check for errors arising in the control of the transmission of the transaction through the interconnect circuitry 8, as distinct from errors within the payload data such as the address, data or response values.

When a new transaction response is received at the master wrapper 10, a sequence number checker 20 examines the unique transaction identifier UTID accompanying the new transaction response and compares this with a copy of the unique transaction identifier UTID (expected data) which was previously sent out by the sequence number generator 18 as part of the corresponding read transaction request. If these two unique transaction identifiers do not match, then this indicates that the read transaction response which has been received does not correspond to the read transaction request which was sent out and accordingly an error, such as mis-routing, has occurred. If such an error is detected, then this triggers the reporting of this error and action upon the error. The reporting may be made, for example, to a supervisor programme or system and the action may, for example, involve repeating the request, resetting the system or a different fail safe response.

It will be appreciated that the master wrapper 10 includes a transaction response receiver which receives the transaction response from the transaction slave 6. The master wrapper 10 further includes control checking circuitry. The sequence number checker 20 and the sequence number generator 18 embody the transaction response receiver and the control checking circuitry in the case of the read request and read response channels. The sequence number generator 18 serves as a transaction identifier generator which generates the transaction identifier for the given transaction master 4. It will be appreciated that in practice the data processing system 2 may include multiple transaction masters 4, each having an associated master wrapper 10. In the same way, each of potential multiple transaction slaves 6 may have their own slave wrappers 12. In other embodiments the circuitry provided within the master wrapper 10 or the slave wrapper 12 may be incorporated as part of the transaction master 4 or the transaction slave 6 respectively. Providing the master wrapper 10 and the slave wrapper 12 separately may permit legacy transaction masters 4 and transaction slaves 6 to utilise the present techniques. It will also be appreciated that the circuitry within the master wrapper 10 and the slave wrapper 12, either individually or in combination, could be included within the interconnect circuitry 8. However, providing the master wrapper 10 and the slave wrapper 12 separately permits legacy interconnect circuitry to be used which may be desirable in at least some circumstances.

The slave wrapper 10 provides a transaction request receiver, a transaction response generator, and a transaction response transmitter, in the form of the sequence number inserter 22 and the sequence number capturer 24, outputting data supplied to it by the transaction slave 6. The sequence number capturer 24 serves as the transaction request receiver in that it receives the new transaction request in above a example and captures from this the unique transaction identifier UTID. This unique transaction identifier UTID is passed to the sequence number inserter 22 which serves as the transaction response generator by concatenating the captured unique transaction identifier UTID with the rest of the transaction signals (e.g. adding the unique transaction identifier UTID into the user data within the transaction sideband signals) to generate a transaction response. The sequence number inserter 22 also serves as the transaction response transmitter as it then sends this transaction response, including the unique transaction identifier UTID, back to the transaction master 4.

The above example has considered a read transaction request and read transaction responses. It will be appreciated that the present techniques may also apply to the write request write data and write response channels. When a write transaction request is sent from the transaction master 4, then a sequence number generator 18 inserts a unique transaction identifier UTID in the user data sideband of the transaction so as to serve as control check data which is passed together with that write request transaction to the transaction slave 6. The slave wrapper 12 which receives the write request using a write data receiver in the form of sequence number capturer 24 serves to read the unique transaction identifier UTID from the write transaction request and pass this to a sequence number checker 20. The sequence number check up 20 compares the captured unique transaction identifier UTID, which accompanied the write transaction request (and now serving as expected data held by the slave wrapper 12), with the control check data which accompanies each beat of write data which is sent from the transaction master 4 to the transaction slave 6. If the expected data (in the form of the captured unique transaction identifier UTID) does not match the control check data received with each beat of the right data, then this triggers reporting of and action upon a detected error. Such an error would indicate that the write data received does not correspond to the write request which the transaction slave 6 is expecting to have received. This could be the result of a misrouting of data through the interconnect circuitry 8.

When the write transaction has finished, the transaction slave 6 generates a write response on the write response channel BR. This write response may have the unique transaction identifier UTID for the corresponding write transaction request added to it as it is passed back to the transaction master 4. The master wrapper 10, reads the unique transaction identifier associated with the write response (the control check data) and compares this with the unique transaction identifier value it is expecting.

It will be seen in FIG. 1 that the error correction code checker and generator circuits 14, 16 are disposed closest to the transaction master 4 and the transaction slave 6 in the signal path. However, in other embodiments, the transmission checking circuitry 20, 22, 24 and the error correction code generators and checkers 14, 16 may be swapped so that it is the transmission control checking circuitry 20, 22, 24 which is adjacent to the transaction master 4 and the transaction slave 6 with the error correction code generators and checkers 14, 16 being adjacent to the interconnect circuitry 6 within the signal paths.

Figure 2:
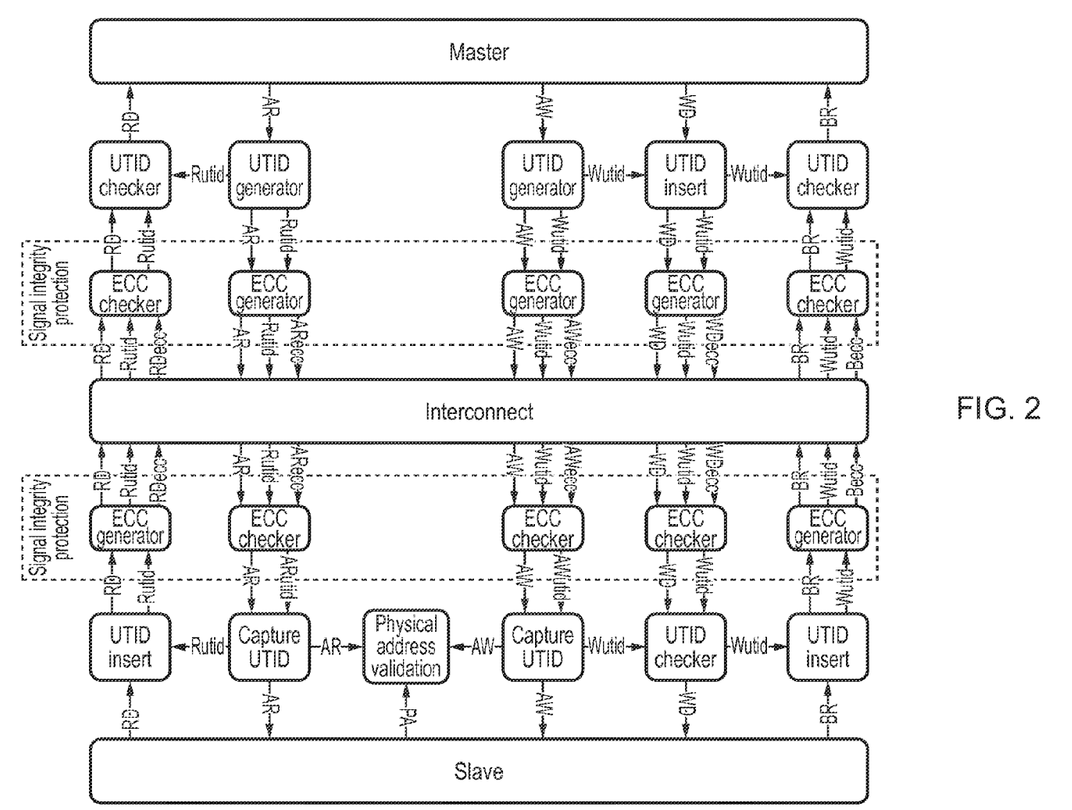
FIG. 2 schematically illustrates a variation upon the FIG. 1 example with the order of the UTID processing and the signal integrity processing swapped.

FIG. 2 schematically illustrates a variation on the example embodiment of FIG. 1 with the order of the UTID processing and the signal integrity processing swapped.

Figure 3:
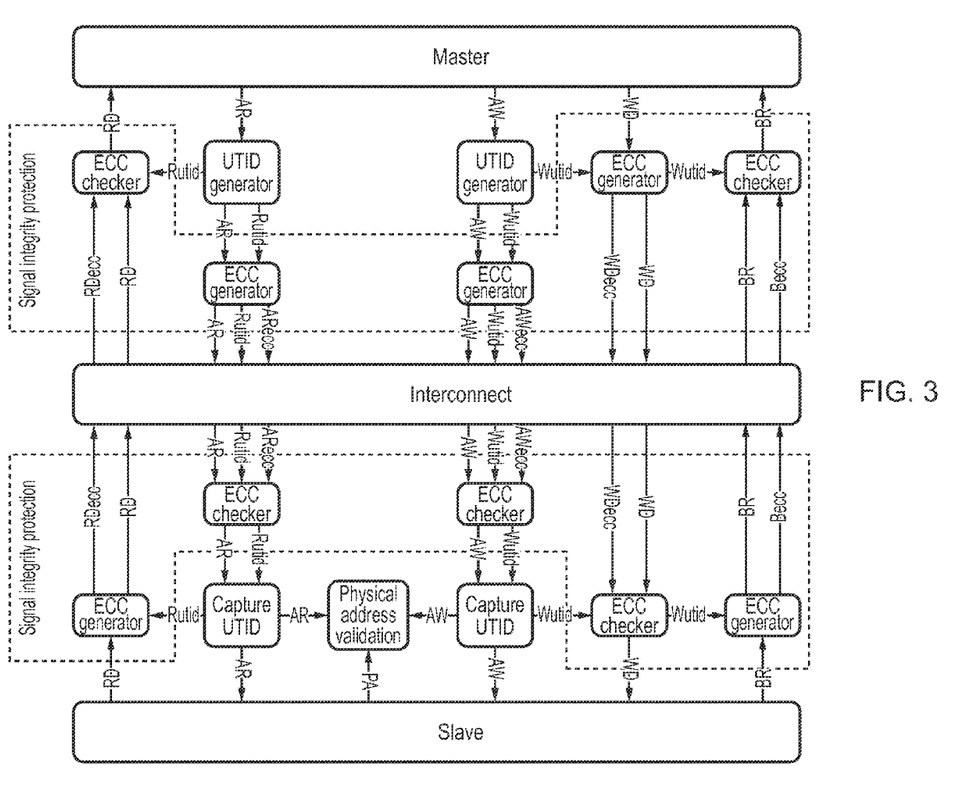
FIG. 3 schematically illustrates a further example embodiment of a data processing apparatus including a bus master, a bus slave, interconnect circuitry and transmission control circuitry.

FIG. 3 is a further example embodiment. In this embodiment, the unique transaction identifier is not separately passed within the user data provided as a sideband signal, but is instead mixed with the payload data which is to be transmitted when forming the error correction code data, i.e. the UTID is included as an input to the ECC generator function. Accordingly, when the error correction code is received together with the payload data, then the expected data can again be mixed with the payload data when the error correction code is recomputed and a determination made as to whether the received error correction code matches the newly completed error correction code, i.e. thereby checking that the control check data matches the expected data. An error in the control of transmission through the interconnect circuitry should mean that the expected data does not match the control checking data and accordingly when the error correction codes are compared there will be a mismatch. A problem with this approach is that there is a probability that a transmission control error may not provoke an error correction code mismatch and accordingly a transmission control error may go undetected. Error detection codes can detect a number of upsets in the data. A SECDED ECC code (commonly used) can detect two upsets; parity (aka SED) can detect one. If the Hamming distance between pairs of UTID codes is greater than this number of bits, then there is a strong possibility that the ECC will not detect the error. If the UTID is "less unique" (uniqueness being an extension of the more general "control check data" concept), and/or the error detection capability of the code is stronger (e.g. a longer CRC code), then using UTID as part of ECC generation may be appropriate.

In the embodiment of FIG. 3, the error correction code Which is dependant upon the unique transaction identifier can be considered to form the control check data and the expected data can be considered to be the computed error correction code which is to be compared with the received error correction code and is computed based upon the expected data which is the unique transaction identifier for the transaction request.

Figure 4:
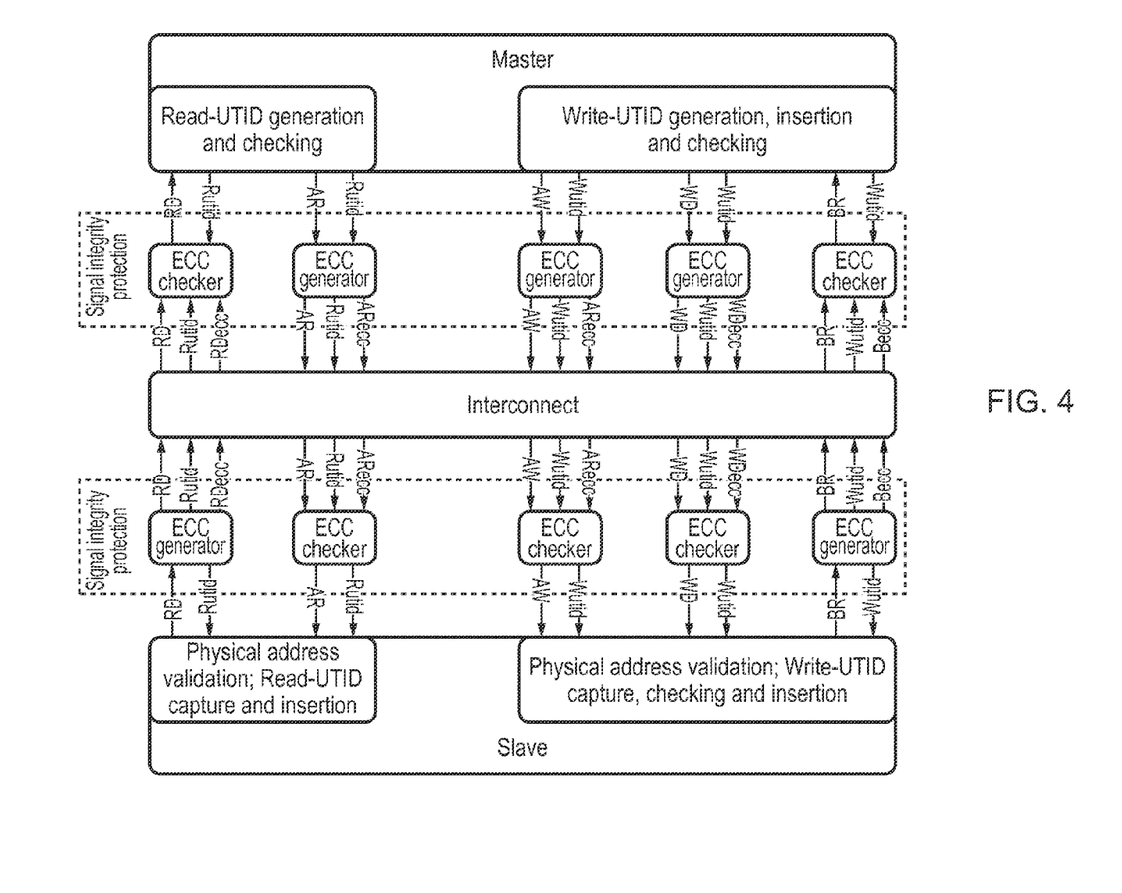
FIG. 4 schematically illustrates a further example embodiment with the UTID (and physical address checking) performed within the master and the slave.

FIG. 4 schematically illustrates a further example embodiment in which the UTID processing (and physical address validation) is performed within the master and slave themselves.

Figure 5:
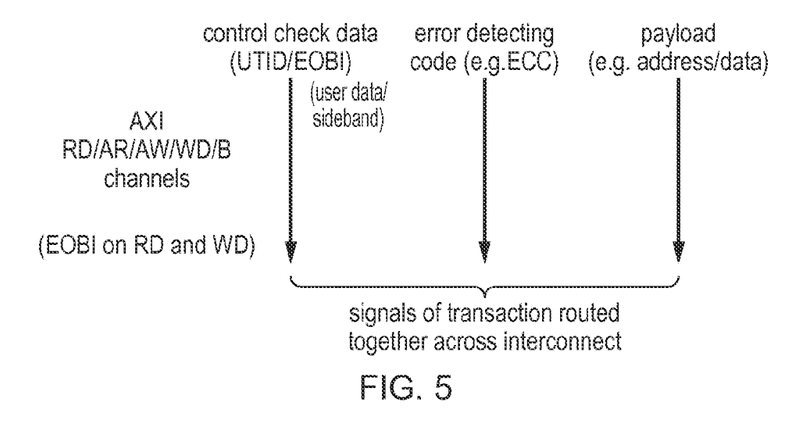
FIG. 5 schematically illustrates one example format of a transaction including both payload data and control check data.

FIG. 5 schematically illustrates one example of the signals forming a transaction to be sent across the data processing apparatus of FIGS. 1 and 2. The transaction signals included payload signals (e.g. addresses, data . . . ), error detecting codes (or other signal integrity protection data), and control check data added to the user data/sideband signals. These user data/sideband signals are provided within the AXI transaction protocol designed by ARM Ltd of Cambridge England. The present techniques are not limited in their application to this particular protocol, e.g. different protocols may have different combinations of channels.

In the case of the read data channel RD and, the write data WD channel, the control check data may additionally include an even/odd beat indicator EOBI as will be discussed further below. This EOBI may be used to check the sequence of data values received (either in response to a read by a receiving transaction master or in response to a write by a receiving transaction slave). The control check data, the error detecting codes and the payload are signals of the transaction which are routed together across the interconnect circuitry 8.

Figure 6:
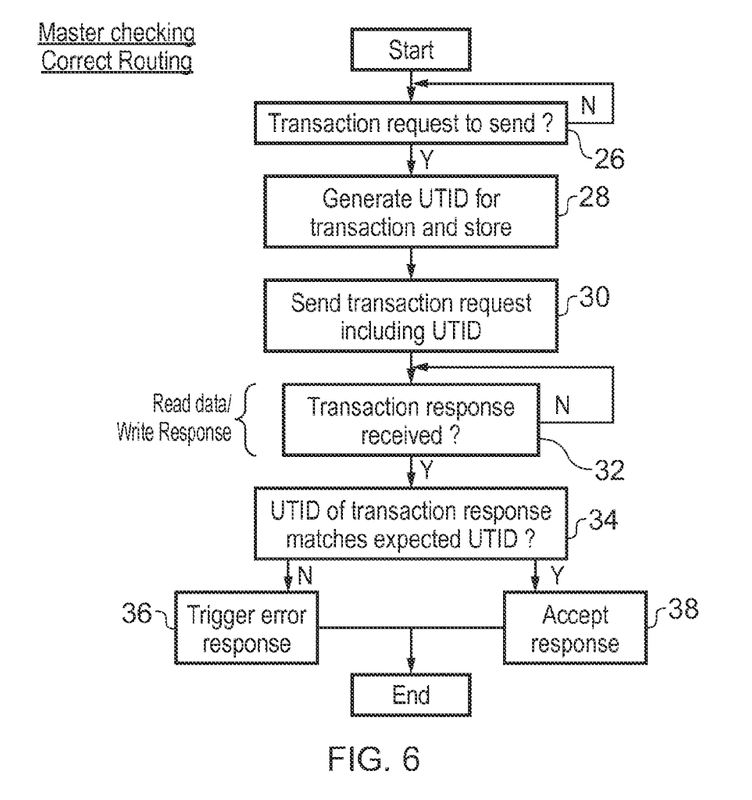
FIG. 6 is a flow diagram schematically illustrating a transaction master checking for correct routing of a received transaction response.

FIG. 6 is a flow diagram schematically illustrating how a transaction master 4 may check for correct routing. At step 26 processing waits until there is a transaction request to send. At step 28 a unique transaction identifier is generated for that transaction request. The unique transaction identifier has a value that is unique among all pending transactions at that point in time. The generation of this unique transaction identifier with this property is discussed further below. At step 30 a transaction request is sent out including the unique transaction identifier. The unique transaction identifier is also held (stored) within the transaction master so it can serve as the expected data to verify correct routing in respect of received transaction responses. The storage location of the expected data can vary. Step 32 waits until a transaction response is received. This can be read data or a write response in the case of a transaction master 4. When a transaction response is received, step 34 compares the control check data in the form of the unique transaction identifier accompanying the received transaction response with the expected data in the form of the stored unique transaction identifier stored at step 28. If there is a mismatch, then step 36 triggers an error response which includes reporting of and action upon the detected error. Reporting of and action upon an error can take a wide variety of different forms, such as, for example, repeating the transaction, discarding the transaction, triggering a reset, etc. If the received control check data matches the expected data, then processing proceeds to step 38 where the response is accepted.

Figure 7:
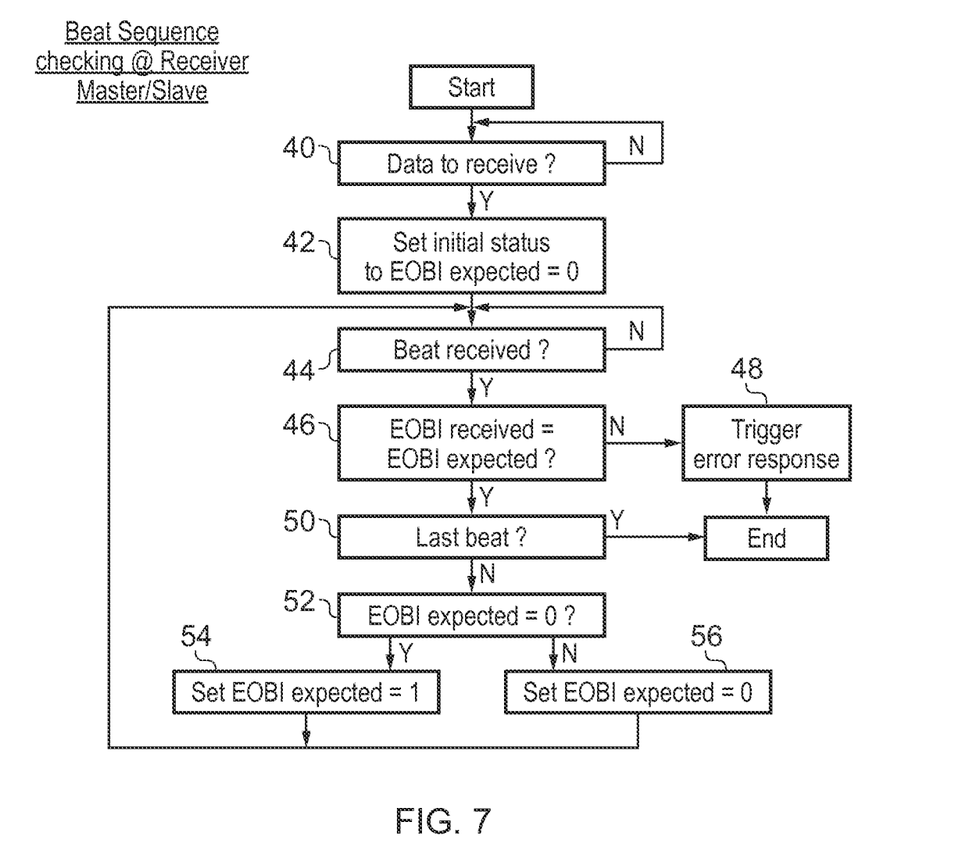
FIG. 7 is a flow diagram schematically illustrating beat sequence checking at receiver.

FIG. 7 is a flow diagram schematically illustrating beat sequence checking at a receiver (either a master or a slave) as discussed above in relation to the EOBI bit of FIG. 3. At step 40 the receiver waits until there is data to receive. Step 42 sets the initial status of the EOBI expected value to 0. Step 44 waits until the first beat of data is received (either read data being returned to a master or write data being received by a slave). The transmitter of the data starts its sequence of data transmissions with the first beat being accompanied by a EOBI value set to 0. Accordingly, if this first beat as sent is the first beat received, then the determination at step 46 as to whether the EOBI value received matches the EOBI value expected will pass. If there is a mismatch between the EOBI expected value and the EOBI received value detected at step 46, then an error response will be triggered at step 48. This error response can take a wide variety of forms, as previously mentioned.

If the EOBI check at step 46 passes, then the beat of data will be accepted and step 50 will continue to determine whether or not the beat of data is the last beat. If the beat of data is the last beat, then the process terminates. If the beat of data is not the last beat, then step 52 determines whether the current EOBI expected value is 0. If the current EOBI expected value is 0, then step 54 inverts this to 1 before returning processing to step 44 to await the next beat received. If the EOBI expected value is currently not 0, then step 56 serves to set the EOBI expected value to 0 before returning the processing to step 44 to await the next beat of data.

It will be appreciated that the processing of FIG. 5 is associated with burst transfers such as burst writes or burst reads. In such burst transfers, a single transfer request is followed by multiple beats of data. These beats of data correspond to a sequence of read response transactions in the case of a burst read or write data values in the case of a burst write. These beats of data have an expected sequence in which they are sent and are assumed to be received in that same sequence. If this sequence is altered, then incorrect operation can resolve. The action of the EOBI value as discussed in relation to FIG. 5 ensures that the sequence of data beats received have the correct alternating sequence of EOBI values. This is effective in detecting an error, such as a beat being repeated and so having the same EOBI value sent twice adjacent to each other, rather than in an alternating sequence. Misdirection could also be detected in this way providing it did not result in the misdirected beat still fulfilling the requirement for the EOBI value to alternate.

As discussed in relation to FIG. 2, EOBI can also be included as an input to the ECC generation function, and therefore not separately transmitted. Since EOBI is a single bit (c.f. the multibit UTID field), an error on EOBI is a single-bit error that is likely to be detected by an FCC code. It is even detected by simpler parity codes (for parity it effectively means switching between even and odd parity checks for different beats of the data). This has the advantage of not routing the signal. (For UTID this approach may not be appropriate because an error may be a multi-bit error that is less likely to be detected. However, a single bit from the UTID could be incorporated into the ECC in this way. For SECDED ECC codes, you can eliminate two bits overall of the sideband return data.)

Figure 8:
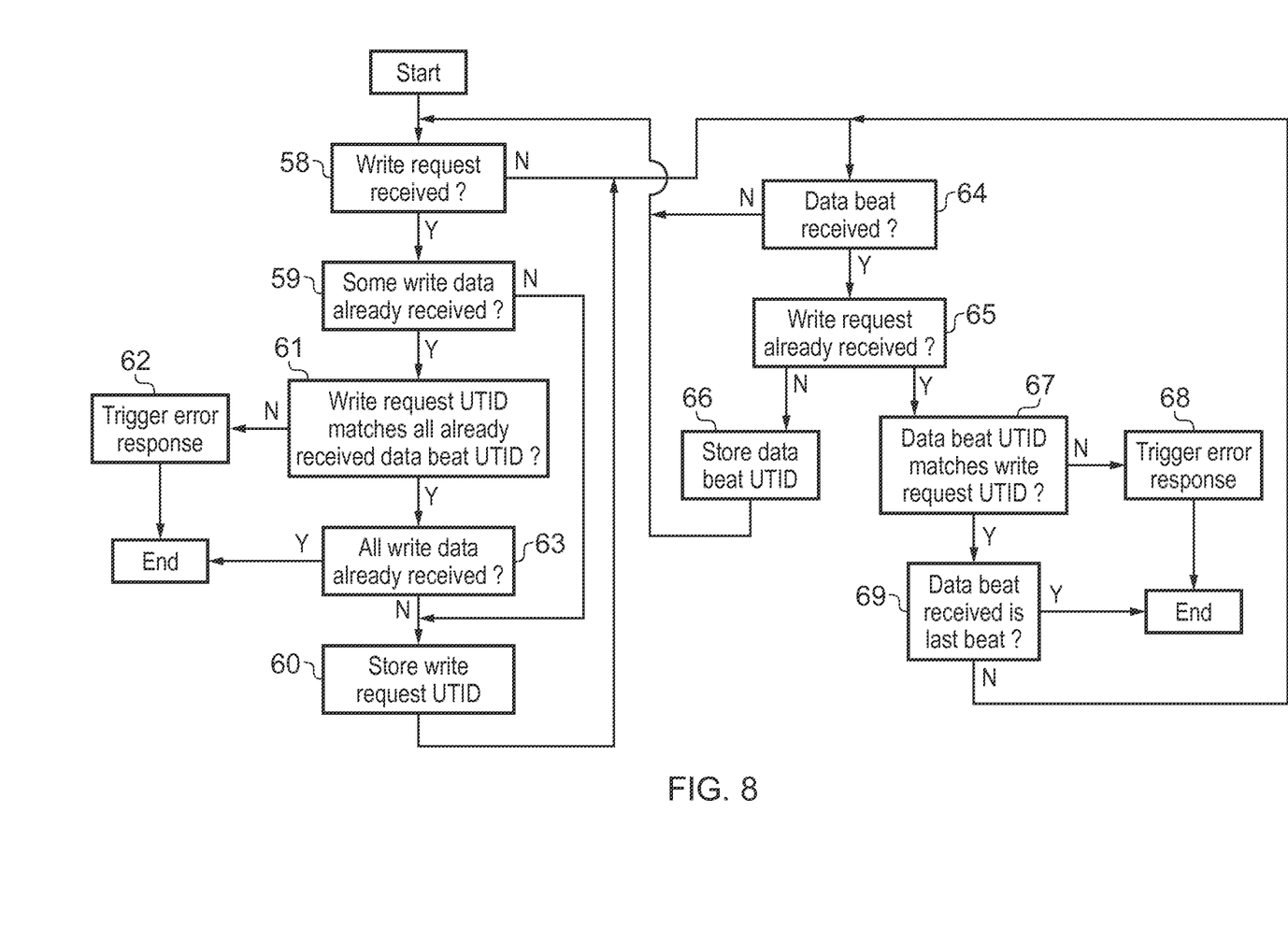
FIG. 8 is a flow diagram schematically illustrating a transaction slave checking correct routing of write data for a write transaction.

FIG. 8 is a flow diagram schematically illustrating processing performed by a transaction slave 6 for checking correct routing of write transactions to that slave. A feature of the transaction protocol may be that write data could be received before a write transaction request. Nevertheless, the processing illustrated in FIG. 8 is able to confirm that the write transaction request unique transaction identifier matches the unique transaction identifier of all received write data beats, regardless of when they are received (before, at the same time, or after) relative to when the write transaction request is received.

Step 58 determines whether a write transaction request has been received. If a write transaction request has been received, then processing proceeds to step 59 where a determination is made as to whether or not any write data beats have already been received without a write transaction request corresponding to those write data beats. If the determination at step 59 is that there are no already received write data beats, then processing proceeds to step 60 where the unique transaction identifier of the write request receive data step 58 is stored.

If the determination at step 59 is that some write data beats have already been received, when processing proceeds to step 61 where a comparison is made between the unique transaction identifier of the write transaction request received at step 58 with the unique transaction identifier of the already received one or more data beats. If these do not match, then an error response is triggered at step 62 and the processing terminates. If the check at step 61 indicates that the unique transaction identifiers match, then processing proceeds to step 63 where a determination is made as to whether or not all the write data beats for the write transaction request received at step 58 have themselves been received. If all the write data beats for the write transaction request have already been received, then processing terminates.

If the determination at step 63 is that all the write data beats have not already been received or following a determination at step 58 that a write transaction request has not been received, then processing proceeds to step 54 where a determination is made as to whether or not a data beat has been received. If a data beat has not been received, then processing returns to step 58. If the determination at step 64 is that a data beat has been received, then at step 65 determines whether or not a write transaction request has already been received. If a write transaction request has not already been received, then step 66 stores the unique transaction identifier of the data beat such that it can subsequently be compared to the write transaction request when it is received (see step 61). Following storage of the data beat unique transaction identifier at step 66, processing returns to step 58.

If the determination at step 65 is that a write transaction request has already been received, then step 67 determines whether the unique transaction identifier of the data beat received matches the unique transaction identifier of the write transaction request that was previously received. If there is not a match, then step 68 triggers an error response and then the processing terminates. If the determination at step 67 indicates that the unique transaction identifiers match, then step 69 serves to determine whether the data beat received at step 64 is the last data beat for the write transaction request. If the data beat received is not the last data beat, then processing returns to step 64. If the data beat received is the last data beat, then the processing terminates.

Figure 9:
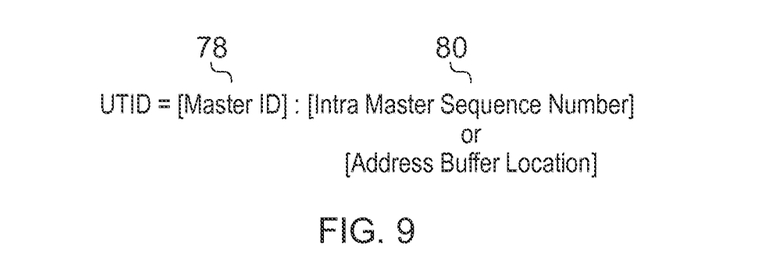
FIG. 9 is a diagram schematically illustrating one example form of a unique transaction identifier.

FIG. 9 schematically illustrates one example form of a unique transaction identifier. This can be formed using a unique identifier value 78 in the form of a transaction master identifier which is unique for a given transaction master among the transaction masters present within the system. This forms a prefix of the unique transaction identifier. A suffix of the unique transaction identifier is formed by a sequence number 80 which is generated within the transaction master and is unique among the currently pending transactions issued by that transaction master. One example way in which the sequence number may be generated is within transaction masters which include address buffers for storing addresses of pending transactions. The location within the address buffer at which the address is stored will be unique to the transaction associated with that address. Accordingly, this storage location for the address may be reused to form the sequence number portion (suffix) of the unique transaction identifier.

The expected value against which the control check data of a transaction response is compared could take a variety of different forms, e.g. it may not directly correspond to the control check data, but may have a form to permit a check to be made that the control check data received is at least consistent with expected control check data, such as has the right parity, generates an expected hash value etc. However, in at least some example embodiments, the expected value may include a transaction identifier of a transaction issued by the given transaction master with this transaction identifier propagating through the interconnect circuitry together with its associated transaction and being reflected back to the transaction master for checking that the transaction response is one corresponding to the transaction request which was originally sent.

In some example embodiments, the transmission control checking circuitry may include a transaction identifier generator serving to generate the transaction identifier for a given transaction master. Providing a separate transaction identifier generator in this way and separate from the other parts of the transaction master simplifies providing the additional protection of the present disclosure against control errors within the interconnect circuitry to transaction masters not originally designed with this capability in mind, e.g. legacy transaction masters.

The protection against malfunctions in the control of transmission through the interconnect circuitry may be improved in some example embodiments by arranging that the transaction identifier is a unique transaction identifier having a unique value among transaction identifiers currently in use for pending transactions. The transaction identifiers may be reused over time, but may be constrained to be unique among pending transactions such that the situation in which multiple transaction responses share a transaction identifier can be avoided thereby avoiding the possibility of an incorrect transaction response being inappropriately identified as matching the expected data due to reuse of a transaction identifier.

In at least some example embodiments, the transaction identifier may form part or all of a sideband signal accompanying the transaction. The interconnect circuitry may be configured to route the transaction independently of the transaction identifier within the sideband signal. Provision for sideband signals (e.g. user data) may already be provided within existing interconnect circuitry protocols and can be used for the purposes of detecting errors in the control of transmission of transactions through the interconnect.

It will be appreciated that the error in the control of transmission of a transaction through the interconnect circuitry may take a variety of different forms. One example form is that the error results in the mis-direction of a transaction response intended for a transaction master other than the given transaction master to which it is returned. Other example errors could be the inappropriate repeat sending of a transaction response, an incorrect sequencing of transaction responses or other errors relating to the control of transmission as distinct from the content of the transaction responses themselves.

The transaction identifier may be formed in a manner to ensure that it is unique amongst pending transactions in at least some example embodiments by forming the transaction identifier as a combination of a unique identifier for the given transaction master among the one or more transaction masters and a number (such as, for example, a sequence number or a currently unused number within a set of numbers) unique among concurrently pending transactions issued by that given transaction master. The unique identifier for the given transaction master may be statically configured and the enforcement of the unique number may be performed by the given transaction master itself as the generation of that number can be under control of that given transaction master.

In some embodiments a given transaction master may include an address buffer configured to store addresses associated with pending transactions. Within such embodiments, it is possible that the storage location within the address buffer of an address corresponding to a pending transaction may be reused to provide the sequence number which forms part of the transaction identifier as explained above. Mechanisms are already provided to ensure that addresses are stored within unique locations within the address buffer and accordingly this uniqueness behaviour may be reused to generate the appropriate sequence number portion of the transaction identifier thereby saving overhead.

In some example embodiments, the transaction that is requested may result in a response sequence comprising a plurality of transaction responses returned to a given transaction master, e.g. a burst read or a burst write transaction may result in a plurality of beats of data being transferred to fulfil that read or write. A problem which can arise for such transactions is that the sequencing of the transaction responses may be inappropriately changed by an error in the control of the transmission through the interconnect circuitry. Accordingly, in some example embodiments, matching of the control check data with the expected data is used to confirm receipt of an expected next transaction response within the response sequence. Thus, the control check data and the expected data track that the transaction responses are received in accordance with the expected sequence in which they will be returned.

One low overhead way of implementing such a check that may be used in at least some example embodiments is that the control check data includes a bit that alternates in value with each successive transaction response within the response sequence, although more generally a beat sequence number may be used (this may be unique for each beat, or could be function of the sequence number that is likely to be unique, e.g. counting or Gray codes). The expected data can accordingly be the bit value that is expected for the next response which is to be received and if the received bit value is not correct, then this indicates that an inappropriate change in the ordering, or an inappropriate repeated data beat, has occurred. The use of a single bit to track beat ordering uses low overhead, detects repeated, swapped and missing beats, and can be incorporated a single error detect error detection code.

It will be appreciated that the present techniques may be applied in a variety of different ways to protect different portions of transactions being conducted across the interconnect circuitry. In at least some example embodiments, the transaction is a data read and the transaction response includes read data. The present technique may in this example serve to check that the read data which is returned is associated with control check data corresponding to control check data sent with the read request which the returned read data is a candidate to fulfil. In the case of multiple data beats, the transaction identifier may be associated with each of the plurality of transaction responses corresponding to those data beats.

In at least some example embodiments of the disclosure, the above techniques which allow at least detecting of errors in the control of transmission of transactions may be accompanied by techniques seeking to detect errors within the data itself (e.g. data values, address values, response values etc.) which is sent as part of the transactions. For example, a transaction response may include an error detecting code (e.g. an ECC code, a parity bit or some other form of code for providing signal integrity protection) and the circuitry further include error detecting circuitry which uses the error detecting code to detect at least some errors in the payload data. Depending upon the code used, the error detecting code may additionally/optionally permit at least some detected errors to also be corrected. The control check data may, in some example embodiments, be combined/included in the error detecting code also used to check the payload data.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus comprising:
   a transaction master to issue transaction requests to one or more transaction slaves via interconnect circuitry;
   a transaction response receiver to receive a transaction response from said one of one or more transaction slaves via said interconnect circuitry, said transaction response including payload data and control check data; and
   control checking circuitry:
      (i) to hold, prior to receipt of said transaction response, expected data corresponding to correct control of transmission of a transaction associated with said transaction response;
      (ii) to check, following receipt of said transaction response, whether said control check data matches said expected data; and
      (iii) when said control check data does not match said expected data, then to trigger reporting of and action upon a detected error;
   wherein:
      said expected data includes a transaction identifier of a transaction request issued by said transaction master; and
      said transaction identifier is a unique transaction identifier having a unique value among unique transaction identifiers concurrently in use for pending transactions.

2. Apparatus as claimed in claim 1, comprising a transaction identifier generator to generate said transaction identifier for said given transaction master.

3. Apparatus as claimed in claim 1, wherein said transaction identifier is at least part of a sideband signal accompanying said transaction and said interconnect circuitry is configured to route said transaction independently of said transaction identifier.

4. Apparatus as claimed in claim 1, wherein:
   (i) said control check data matching said transaction identifier corresponds to return of said transaction response to said given transaction; and
   (ii) said control check data not matching said transaction identifier corresponds to receipt of a misdirected transaction response intended for a transaction master other than said given transaction master.

5. Apparatus as claimed in claim 1, wherein said transaction identifier is a combination of:
   (i) a unique identifier value for said given transaction master among said one or more transaction masters; and
   (ii) a number unique among concurrently pending transactions issued by said given transaction master.

6. Apparatus as claimed in claim 5, wherein said given transaction master includes an address buffer to store addresses associated with pending transactions within a plurality of storage locations of said address buffer and said number is determined by which of said plurality of storage location stores an address corresponding to said transaction.

7. Apparatus as claimed in claim 1, wherein said transaction results in a response sequence comprising a plurality of transaction responses returned to said given transaction master.

8. Apparatus as claimed in claim 7, wherein said control check data is sequence check data and said control check data matching said expected data corresponds to receipt of an expected next transaction response within said response sequence.

9. Apparatus as claimed in claim 8, wherein said control check data includes a bit that alternates in value with each successive transaction response within said response sequence.

10. Apparatus as claimed in claim 1, wherein said transaction is a data read and said transaction response includes read data.

11. Apparatus as claimed in claim 1, wherein said transaction results in a response sequence comprising a plurality of transaction responses returned to said given transaction master and said transaction identifier is associated with each of said plurality of transaction responses.

12. Apparatus as claimed in claim 1, wherein said transaction response includes an error detecting code and further comprising error detecting circuitry to use said error detecting code to detect at least some errors in said payload data.

13. Apparatus comprising:
   means for issuing transaction requests to one or more transaction slaves via interconnect circuitry;
   means for receiving a transaction response from said one of one or more transaction slaves via said interconnect circuitry, said transaction response including payload data and control check data; and
   means for:
      (i) holding, prior to receipt of said transaction response, expected data corresponding to correct control of transmission of a transaction associated with said transaction response;
      (ii) detecting, following receipt of said transaction response, whether said control check data matches said expected data; and
      (iii) when said control check data does not match said expected data, then to trigger reporting of and action upon a detected error;
   wherein:
      said expected data includes a transaction identifier of a transaction request issued by said means for issuing transaction requests; and
      said transaction identifier is a unique transaction identifier having a unique value among unique transaction identifiers concurrently in use for pending transactions.

14. A method comprising the steps of:
- issuing transaction requests to one or more transaction slaves via interconnect circuitry;
- receiving a transaction response from one of one or more transaction slaves via interconnect circuitry, said transaction response including payload data and control check data; and
- holding, prior to receipt of said transaction response, expected data corresponding to correct control of transmission of a transaction associated with said transaction response;
- detecting, following receipt of said transaction response, whether said control check data matches said expected data; and
- when said control check data does not match said expected data, then triggering reporting of and action upon a detected error;

wherein:
- said expected data includes a transaction identifier of an issued transaction request; and
- said transaction identifier is a unique transaction identifier having a unique value among unique transaction identifiers concurrently in use for pending transactions.

\* \* \* \* \*